(12) United States Patent
Lewin et al.

(10) Patent No.: US 7,774,565 B2
(45) Date of Patent: Aug. 10, 2010

(54) METHODS AND APPARATUS FOR POINT IN TIME DATA ACCESS AND RECOVERY

(75) Inventors: Michael Lewin, Modiin (IL); Yair Heller, Tel Aviv (IL); Ziv Kedem, Tel Aviv (IL); Shlomo Ahal, Tel-Aviv (IL); Assaf Natanzon, Ramat-Gan (IL); Avi Shoshan, Kfar-Shemuel (IL); Evgeny Drukh, Rehovot (IL); Efrat Angel, Rehovot (IL); Oded Weber, Qiriat-Ono (IL)

(73) Assignee: EMC Israel Development Center, Ltd., Netanya (IL)

( * ) Notice: Subject to any disclaimer, the term of this patent is extended or adjusted under 35 U.S.C. 154(b) by 487 days.

(21) Appl. No.: 11/609,560

(22) Filed: Dec. 12, 2006

(65) Prior Publication Data

US 2007/0162513 A1 Jul. 12, 2007

Related U.S. Application Data

(60) Provisional application No. 60/752,665, filed on Dec. 21, 2005.

(51) Int. Cl.
G06F 12/00 (2006.01)
G06F 13/00 (2006.01)
G06F 13/28 (2006.01)
G06F 7/00 (2006.01)
G06F 17/00 (2006.01)

(52) U.S. Cl. ............................. 711/162; 711/E12.001; 707/648; 707/683; 707/684

(58) Field of Classification Search .................. 711/162
See application file for complete search history.

(56) References Cited

U.S. PATENT DOCUMENTS

| 5,170,480 A | 12/1992 | Mohan et al. |
| 5,499,367 A | 3/1996 | Bamford et al. |
| 5,864,837 A | 1/1999 | Maimone |
| 6,065,018 A | 5/2000 | Beier et al. |
| 6,148,340 A | 11/2000 | Bittinger et al. |

(Continued)

OTHER PUBLICATIONS

Microsoft Computer Dictionary, 2002, Microsoft Press, Fifth Edition, p. 58.*

(Continued)

*Primary Examiner*—Matt Kim
*Assistant Examiner*—Ralph A Verderamo, III
(74) *Attorney, Agent, or Firm*—Daly, Crowley, Mofford & Durkee, LLP

(57) ABSTRACT

Methods and systems for accessing data from a previous point in time, including receiving data stored in a storage system of addressable memory, the storage system including a plurality of addresses, receiving a journal history of write transactions for the storage, each write transaction including (i) a plurality of designated memory addresses, (ii) a corresponding plurality of current data to write in the designated memory addresses for storage, and (iii) a time indicator, generating a data structure that represents a virtual interface to the storage at a specified point in time, based on the write transactions in the journal history having a time subsequent to the specified point in time, and enabling a user to process the data from the specified point in time, via the virtual interface and the journal history.

20 Claims, 12 Drawing Sheets

U.S. PATENT DOCUMENTS

| | | | |
|---|---|---|---|
| 6,260,125 | B1 | 7/2001 | McDowell |
| 6,272,534 | B1 | 8/2001 | Guha |
| 6,467,023 | B1 | 10/2002 | DeKoning et al. |
| 6,574,657 | B1 | 6/2003 | Dickinson |
| 6,947,981 | B2 | 9/2005 | Lubbers et al. |
| 7,043,610 | B2 * | 5/2006 | Horn et al. ............ 711/144 |
| 7,076,620 | B2 | 7/2006 | Takeda et al. |
| 7,111,197 | B2 | 9/2006 | Kingsbury et al. |
| 7,120,768 | B2 | 10/2006 | Mizuno et al. |
| 7,139,927 | B2 | 11/2006 | Park et al. |
| 7,222,136 | B1 | 5/2007 | Brown et al. |
| 7,296,008 | B2 * | 11/2007 | Passerini et al. ............ 707/1 |
| 7,426,618 | B2 | 9/2008 | Vu et al. |
| 7,516,287 | B2 | 4/2009 | Ahal et al. |
| 7,519,625 | B2 | 4/2009 | Honami et al. |
| 7,577,867 | B2 | 8/2009 | Lewin et al. |
| 7,627,612 | B2 | 12/2009 | Ahal et al. |
| 7,627,687 | B2 | 12/2009 | Ahal et al. |
| 2002/0129168 | A1 | 9/2002 | Kanai et al. |
| 2003/0110278 | A1 | 6/2003 | Anderson |
| 2004/0205092 | A1 * | 10/2004 | Longo et al. ............ 707/205 |
| 2004/0254964 | A1 | 12/2004 | Kodama et al. |
| 2005/0015663 | A1 | 1/2005 | Armangau et al. |
| 2005/0172092 | A1 | 8/2005 | Lam et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0117211 | A1 | 6/2006 | Matsunami et al. |
| 2006/0161810 | A1 | 7/2006 | Bao |
| 2006/0195670 | A1 | 8/2006 | Iwamura et al. |
| 2006/0212462 | A1 | 9/2006 | Heller et al. |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0220311 | A1 | 9/2007 | Lewin et al. |
| 2007/0266053 | A1 | 11/2007 | Ahal et al. |
| 2008/0082591 | A1 | 4/2008 | Ahal et al. |
| 2008/0082592 | A1 | 4/2008 | Ahal et al. |
| 2008/0082770 | A1 | 4/2008 | Ahal et al. |

OTHER PUBLICATIONS

Shlomo Ahal; "Methods and Apparatus for Multiple Point in Time Data Access;" U.S. Appl. No. 11/609,561, filed Dec. 12, 2006.

Michael Lewin; "Cross Tagging of Data for Consistent Recovery:" U.S. Appl. No. 11/356,920, filed Feb. 17, 2006.

Shlomo Ahal, "Methods and Apparatus for Optimal Journaling for Continuous Data Replication;" U.S. Appl. No. 11/536,215, filed Sep. 28, 2006.

Shlomo Ahal, "Methods and Apparatus for Optimal Journaling for Continuous Data Replication;" U.S. Appl. No. 11/536,233, filed Sep. 28, 2006.

Shlomo Ahal, "Methods and Apparatus for Managing Data Flow in a Continuous Data Replication System Having Journaling;" U.S. Appl. No. 11/536,160, filed Sep. 28, 2006.

File downloaded from PAIR for U.S. Appl. No. 10/512,687, filed Aug. 24, 2005, file through Jun. 3, 2009, 348 pages.

File downloaded from PAIR for U.S. Appl. No. 11/609,561, filed Dec. 12, 2006, file through Jun. 3, 2009, 435 pages.

File downloaded from PAIR for U.S. Appl. No. 11/356,920, filed Feb. 17, 2006, file through Jun. 3, 2009, 552 pages.

File downloaded from PAIR for U.S. Appl. No. 11/536,215, filed Nov. 28, 2006, file through Jun. 9, 2009, 165 pages.

File downloaded from PAIR for U.S. Appl. No. 11/536,233, filed Nov. 28, 2006, file through Jun. 9, 2009, 213 pages.

File downloaded from PAIR for U.S. Appl. No. 11/536,160, filed Sep. 28, 2006 file downloaded through Jun. 3, 2009, 155 pages.

File downloaded from PAIR for U.S. Appl. No. 11/536,160, filed Sep. 28, 2006 file downloaded Jun. 4, 2009 through Jan. 12, 2010, 50 pages.

File downloaded from PAIR for U.S. Appl. No. 10/512,687, filed Aug. 24, 2005, file downloaded Jun. 4, 2009 through Jan. 12, 2010, 48 pages.

File downloaded from PAIR for U.S. Appl. No. 11/609,561, filed Dec. 12, 2006, file downloaded Jun. 4, 2009 through Jan. 12, 2010, 46 pages.

File downloaded from PAIR for U.S. Appl. No. 11/356,920, filed Feb. 17, 2006, file downloaded Jun. 4, 2009 through Jan. 12, 2010, 4 pages.

File downloaded from PAIR for U.S. Appl. No. 11/536,215, filed Nov. 28, 2006, file downloaded Jun. 4, 2009 through Jan. 12, 2010, 2 pages.

File downloaded from PAIR for U.S. Appl. No. 11/536,233, filed Nov. 28, 2006, file downloaded Jun. 4, 2009 through Jan. 12, 2010, 43 pages.

* cited by examiner

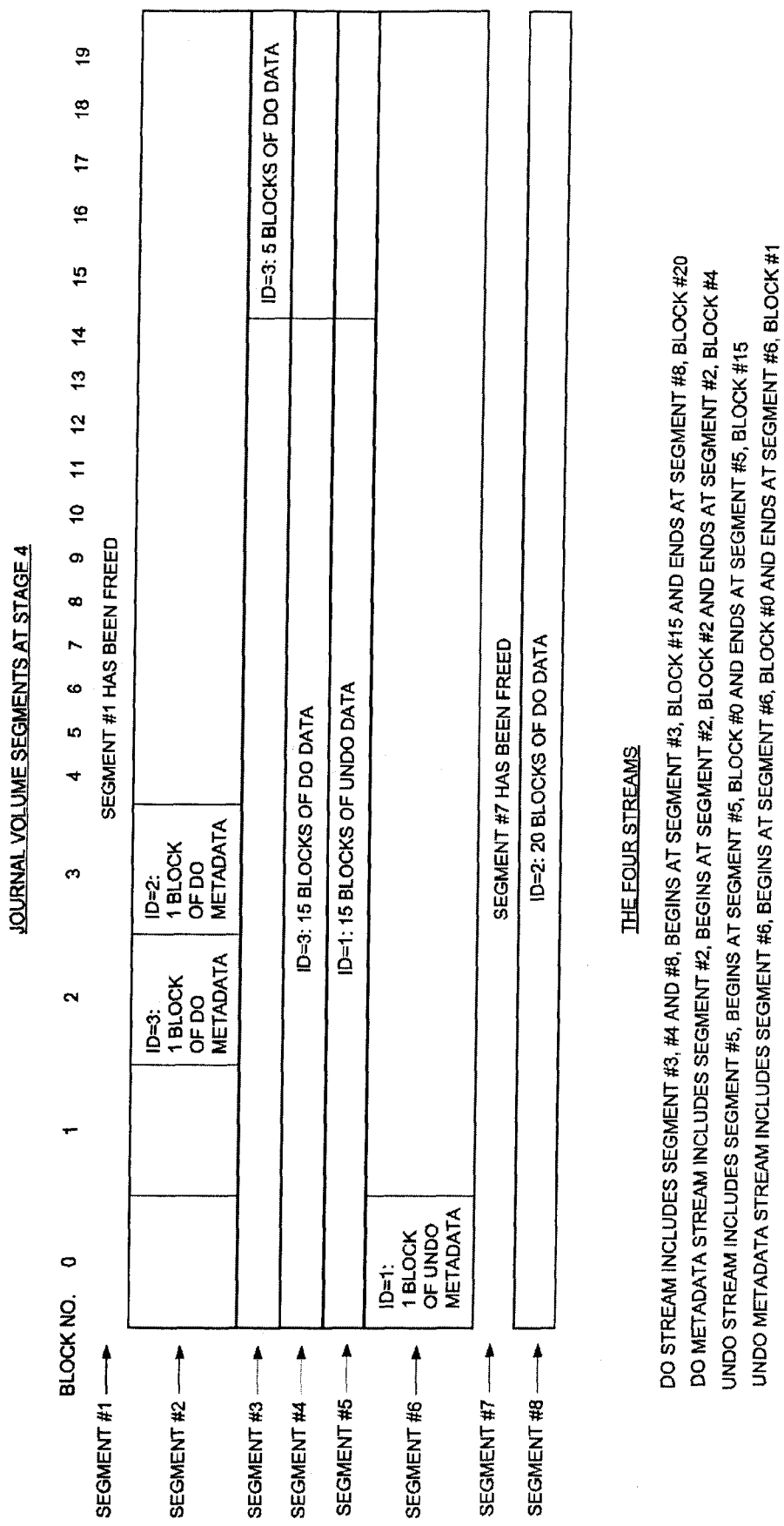

though the cost of memory has become a relatively insignificant factor, organizations can afford to operate with systems that store and process terabytes of data.
METHODS AND APPARATUS FOR POINT IN TIME DATA ACCESS AND RECOVERY

CROSS REFERENCE TO RELATED APPLICATIONS

The present application claims the benefit of U.S. Provisional Patent Application No. 60/752,665, filed on Dec. 21, 2005, which is incorporated herein by reference.

BACKGROUND

As is known in the art, computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational data on a periodic basis. Such systems suffer from several drawbacks. First, they require a system shutdown during backup, since the data being backed up cannot be used during the backup operation. Second, they limit the points in time to which the organization to recover. For example, if data is backed up on a daily basis, there may be several hours of lost data in the event of a disaster. Third, the data recovery process itself takes a long time.

Another conventional data protection system uses data replication, by creating a copy of the organization's data on a secondary backup storage system, and updating the backup occur with changes. The backup storage system may be situated in the same physical location as the production storage system, or in a physically remote location. Data replication systems generally operate either at the application level, or at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization data is unavailable, during a recovery, and (ii) enable recovery as close a possible to any specified point in time within a recent history.

Continuous data protection typically uses a technology referred to as "journaling", whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

The present invention provides systems and methods for efficient data access and recovery by enabling access to data that was in a storage system at an earlier point in time, while simultaneously performing a storage rollback. Such access is uninterrupted when the rollback is completed, thus minimizing system down time during a recovery operation.

In one aspect of the invention, a method comprises accessing data from a previous point in time, including receiving data stored in a storage system of addressable memory, the storage system including a plurality of addresses, receiving a journal history of write transactions for the storage, each write transaction including (i) a plurality of designated memory addresses, (ii) a corresponding plurality of current data to write in the designated memory addresses for storage, and (iii) a time indicator, generating a data structure that represents a virtual interface to the storage at a specified point in time, based on the write transactions in the journal history having a time subsequent to the specified point in time, and enabling a user to process data from the specified point in time, via the virtual interface and the journal history.

In another aspect of the invention, a data access system comprises a storage system of addressable memory, the storage system including data stored at a plurality of addresses, a journal history of write transactions for said storage system, each write transaction including (i) a plurality of designated memory addresses, (ii) a corresponding plurality of current data to write in the designated memory addresses for storage, and (iii) a time indicator, a data protector, including a data protector memory, a journal processor for generating a data structure, stored within said data protector memory, which represents a virtual interface to the storage at a specified point in time, based on the write transactions in the journal having a data and time subsequent to the specified point in time, a storage manager for rolling back the storage to the data that was stored therein at the specified point in time, based on the journal of write transactions, while a user is using the virtual interface to the storage, and a data protector switcher for switching from the virtual storage interface via the journal history, over to a direct interface to the rolled back storage, after completion of the rolling back, thereby enabling the user to continue data processing without interruption, and a host application driver for enabling a user to process data from the specified point in time, via the virtual interface and the journal history.

In a further aspect of the invention, a computer-readable storage medium comprises storing program code for causing at least one computing device to receive data stored in a storage system of addressable memory, the storage system including a plurality of addresses, to receive a journal history of write transactions for the storage, each write transaction including (i) a plurality of designated memory addresses, (ii) a corresponding plurality of current data to write in the designated memory addresses for storage, and (iii) a time indicator, to generate a data structure that represents a virtual interface to the storage at a specified point in time, based on the write transactions in the journal history having a time subsequent to the specified point in time, and to enable a user to process data from the specified point in time, via the virtual interface and the journal history.

BRIEF DESCRIPTION OF THE DRAWINGS

The present invention will be more fully understood and appreciated from the following detailed description, taken in conjunction with the drawings in which:

FIGS. 2B-2E are illustrations of various stages of generation of a journal history in a detailed example, in accordance with an exemplary embodiment of the present invention;

DETAILED DESCRIPTION

Figure 1:
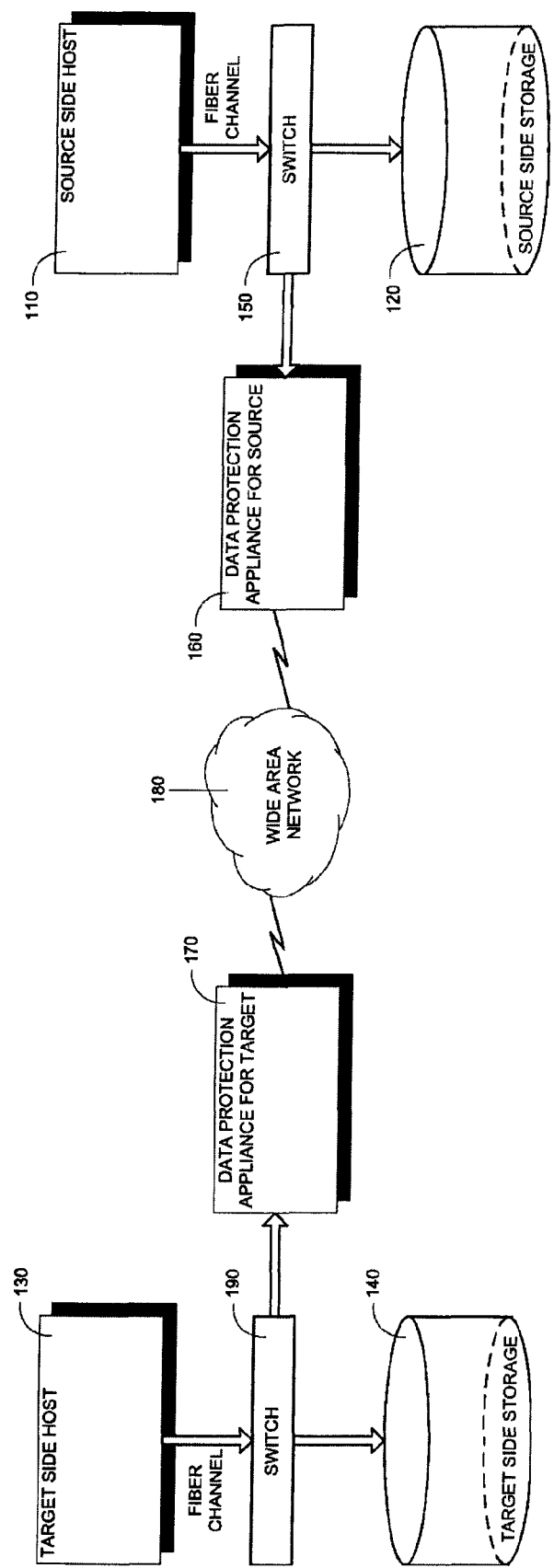
FIG. 1 is a block diagram of a data protection system in accordance with an exemplary embodiment of the present invention.

FIG. 1 is a block diagram of a data protection system in accordance with exemplary embodiments of the present invention. The components in FIG. 1 are arranged into two groups; namely, source side components on the left, and target side components on the right. The source side represents a production site with a host computer 110 running a host application, and a storage system 120 storing host data in addressable storage locations. The target represents a data replication site, with its own host computer 130, and its own storage system 140 that is used to store a copy of the data in storage system 120, as well as additional data.

The source and target sides are connected via a wide area network (WAN) 180. Each host computer and its corresponding storage system are coupled through a storage area network (SAN) that includes network switches, such a fiber channel switches. The communication links between each host computer and its corresponding storage system, may be any appropriate medium suitable for data transfer, such as fiber communication channel links.

Host computers 110 and 130 may each be implemented as one computer, or as a plurality of computers, or as a network of distributed computers. Generally, a host computer runs one or more applications, such as database applications and e-mail servers. Each storage system 120 and 140 includes one or more physical storage devices, such as single disks or redundant arrays of inexpensive disks (RAID). Storage system 140 generally includes a copy of storage system 120, as well as additional data.

In the course of continuous operation, host computer 110 issues I/O requests (write/read operations) to storage system 120 using, for example, small computer system interface (SCSI) commands. Such requests are generally transmitted to storage system 120 with an address that includes a specific device identifier, an offset within the device, and a data size. Offsets are generally granularized to 512 byte blocks. The average size of a write operation issued by the host computer may be, for example, 10 kilobytes (KB); i.e., 20 blocks. For an I/O rate of 50 megabytes (MB) per second, this corresponds to approximately 5,000 write transactions per second.

In accordance with an exemplary embodiment of the present invention, a replica of write operations issued by host computer 110 to storage system 120 is transmitted to a source-side data protection appliance (DPA) 160. In one embodiment, DPA 160, and its counterpart at the target side DPA 170, include their own internal memories and computing processors. In the architecture illustrated in FIG. 1 the DPAs are standalone devices integrated within a SAN. Alternatively, the DPAs may be integrated into the respective storage systems, or integrated into the respective host computers. The DPAs communicate with their respective hosts through communication lines such as fiber channels.

In accordance with a preferred embodiment of the present invention, DPA 160 and DPA 170 are "initiators"; i.e., the DPAs can issue I/O requests using, for example, SCSI commands, to storage devices of their respective storage systems. Specifically, the DPAs may issue I/O requests to one or more storage devices of their respective storage systems, referred to as "journal volumes". The DPAs are also programmed with the necessary functionality to act as a "target"; i.e., to reply to I/O requests, such as SCSI commands, issued by other initiators, such as their respective host computer.

DPA 160 sends write transactions over a wide area network 180 to a second DPI 170 at the target side, for incorporation within target storage system 140. DPA 160 may send its write transactions to DPA 170 using a variety of modes of transmission, including inter alia (i) a synchronous mode, (ii) an asynchronous mode, and (iii) a snapshot mode. In synchronous mode, DPA 160 sends each write transaction to DPA 170, receives back an acknowledgement, and in turns sends an acknowledgement back to host computer 110. Host computer waits until receipt of such acknowledgement before issuing further write transactions. In asynchronous mode, DPA 160 sends an acknowledgement to host computer 110 upon receipt of each write transaction, before receiving an acknowledgement back from DPA 170. In snapshot mode, DPA 160 receives several write transactions and combines them into an aggregate "snapshot" of all write activity performed in the multiple write transactions, and sends such snapshots to DPA 170, for incorporation in target storage system 140.

For the sake of clarity, the ensuing discussion assumes that information is transmitted at a write-by-write granularity. During normal operations, the direction of replicate data flow goes from source side to target side. Generally, during data recovery the direction of replicate data flow is reversed, with the target side behaving as if it were the source side, and vice versa. To this end, the target side also includes a switch 190, making the target side symmetric with the source side.

In an exemplary embodiment of the present invention, DPA 160 is operative to send write transactions from the source side to the target side. DPA 170 is operative to maintain a journal history of write transactions, as described in detail hereinbelow. Journal histories maybe stored in a journal volume. Such journal volume may include one or more physical storage device units, or it may be a part of a storage system. The size of the journal volume determines the size of a journal history that can be stored. A possible size for a journal volume is 500 GB. Since the source side has the capability to act as a target side, a journal volume is also defined at the source side.

It is understood that exemplary system shown in FIG. 1 is intended to be representative of a data protection system, and actual systems may vary in architecture and network topology. Additional safety measures may be used in such a system. Thus, each DPA may in fact be a cluster of computers, thereby ensuring that if a DPA computer is down, then the DPA functionality switches over to another computer.

It is further understood that in practice the architecture may vary from one organization to another. Thus, although the target side is illustrated as being remote from the source side in FIG. 1, in some systems the two sides may be at the same local site. Local data replication is faster than remote data replication, and the lag between target and source is minimal, but remote data replication has the advantage of being robust in the event that a disaster occurs at the source side. It is also contemplated that the present invention be implemented within a source side architecture alone, without there being a target side.

Figure 2A:
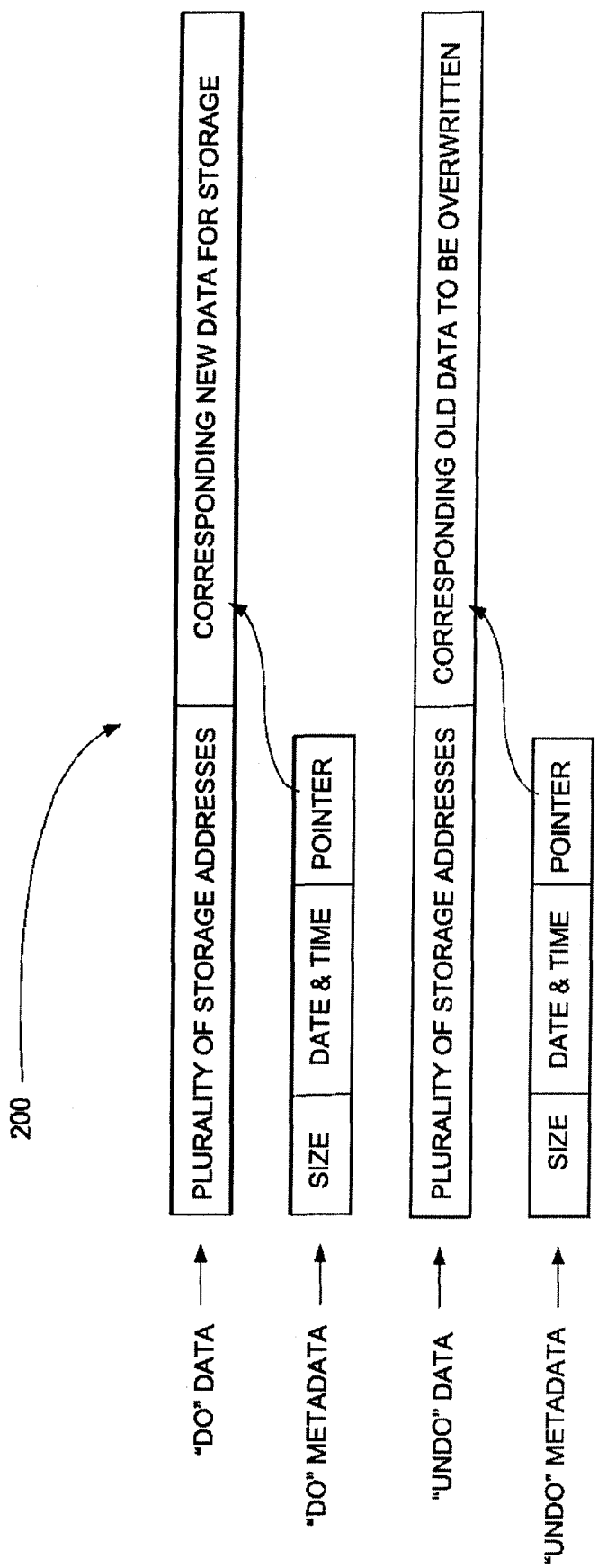
FIG. 2A is an illustration of a journal history of write transactions for a storage system, in accordance with an exemplary embodiment of the present invention.

Reference is now made to FIG. 2A, which is a simplified illustration of a journal history 200 of write transactions for a storage system, in accordance with a preferred embodiment of the present invention. A write transaction generally includes the following fields:

a time at which the transaction was received by the source side DPA;

a write length;

a location in the storage system to which the data is written; and the data itself.

Write transactions are transmitted from source side DPA 160 to target side DPA 170. DPA 170 preferably records the received write transactions in four streams. A first stream, referred to as a DO stream, includes new data for writing in the storage system. A second stream, referred to as an DO METADATA stream, includes metadata for the write transaction, such as an identifier, a date & time, a write size, a beginning address in the data volume for writing the new data in, and a pointer to the offset in the do stream where the corresponding data is located. Similarly, a third stream, referred to as an UNDO stream, includes old data that is overwritten in the data volume; and a fourth stream, referred to as an UNDO METADATA, include an identifier, a date & time, a write size, a beginning address in the data volume where data is to be overwritten, and a pointer to the offset in the undo stream where the corresponding old data is located.

In practice each of the four streams holds a plurality of write transaction data. As write transactions are received dynamically by target DPA 170, they are recorded at the end of the DO stream and the end of the DO METADATA stream, prior to committing the transaction. During transaction application, when the various write transactions are applied to the storage system, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream for writing into addresses within the storage system. Prior to writing the UNDO data into these addresses, the newer data residing in such addresses is recorded in the DO stream.

More specifically, in accordance with an exemplary embodiment of the present invention, journal history 200 is stored within a specific storage volume, or striped over several volumes, referred to collectively as a "journal volume". Journal history 200 may have its own partition within a volume.

The journal volume can be partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers: a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 170, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as follows.

Step 1: The new data is written at the end of the DO stream, assuming a forward write direction, and corresponding metadata is written at the end of the DO METADATA stream.

Step 2: Data is read from the beginning of the DO stream, and corresponding metadata is read from the beginning of the DO METADATA stream.

Step 3: Old data to be overwritten is read from the storage system. The location and size of such old data is determined from the DO METADATA stream.

Step 4: The old data is written at the end of the UNDO stream, and corresponding metadata is written at the end of the UNDO METADATA stream.

Step 5: The new data read at step 2 is written into the storage system, and the beginning and end pointers of the DO and DO METADATA streams are moved appropriately.

Conversely, during a rollback to undo a write transaction, the above operations are reversed, as follows:

Step 1: Read the data and metadata from the end of the UNDO and UNDO METADATA streams.

Step 2: Read from the storage system the data that is to be overwritten. The location and size of such data is determined from the UNDO METADATA stream.

Step 3: Write the data from step 2 at the beginning of the DO stream, and update the DO METADATA stream accordingly.

Step 4: Write the data from step 1 to the storage system, and update the beginning and end pointers of the UNDO and UNDO metadata streams appropriately.

The following example, in conjunction with FIGS. 2B-2E, describes further details of the journaling process, in accordance with an exemplary embodiment of the present invention. A journal volume includes a plurality of segments from a segment pool, each segment including 20 data blocks. Three write transactions are received, as indicated in TABLE I.

TABLE I

| | | Example Write Transactions | | | |
|---|---|---|---|---|---|
| Write ID | Group ID | Time | Data volume location | Length | Journal volume location |
| 1 | 1 | Dec. 3, 2005 10:00:00.00 | Vol. 1, offset 57 blocks | 15 blocks | Segment 1, offset 0 |
| 2 | 1 | Dec 3, 2005 10:00:00.05 | Vol. 1, offset 87 blocks | 20 blocks | Segment 1, offset 15 |
| 3 | 1 | Dec. 3, 2005 10:00:00.18 | Vol. 2, offset 12 blocks | 20 blocks | Segment 3, Offset 15 |

The following discussion describes four stages of journaling and data storage; namely, Stage #1: Enter the three write transactions as journal entries in the journal volume.

Stage #2: Apply the first write transaction to the data volume.

Stage #3: Apply the second write transaction to the data volume.

Stage #4: Rollback the second write transaction, to recover data from an earlier point in time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Figure 2B:
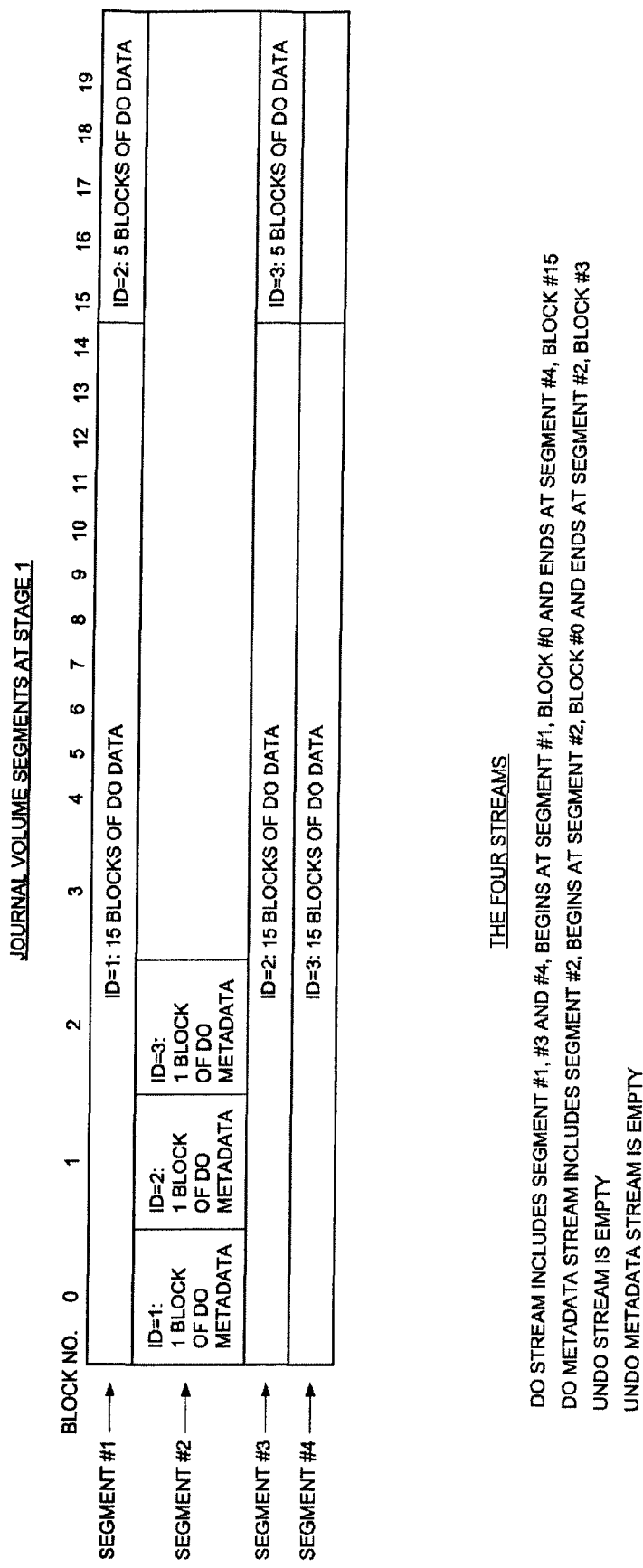

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal history and the four streams at the end of stage #1 are illustrated in FIG. 2B.

At stage #2 the write transaction with ID=1 is applied to the storage system. New data to be written is read from the journal volume at the offset and length indicated in the DO METADATA; namely, 15 blocks of data located in blocks 0-14 of journal volume Segment #1. Correspondingly, old data is read from the storage data volume at the offset and length indicated in the UNDO METADATA; namely, 15 blocks of data located in blocks 57-71 of Data Volume #1. The old data is then written into the UNDO stream in the journal volume, and the associated metadata is written into the UNDO METADATA stream in the journal volume. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 2C:
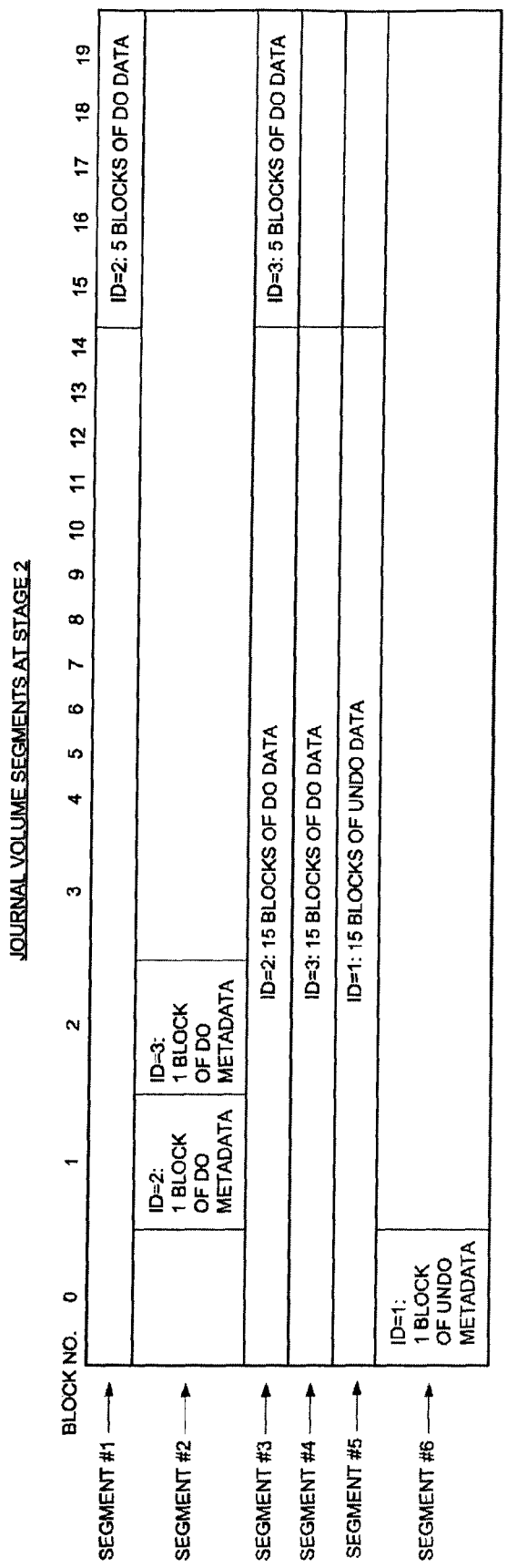

At this point, the new data that was read from blocks 0-14 of journal volume Segment #1 is written to blocks 57-71 of Data Volume #1. The beginning pointer for the DO stream is moved forward to block 15 of journal volume Segment #1, and the beginning pointer for the DO METADATA stream is moved forward to block 1 of journal volume Segment #2. The journal history and the four streams at the end of stage #2 are illustrated in FIG. 2C.

At stage #3 the write transaction with ID=2 is applied to the storage system. As above, 20 blocks of new data are read from blocks 15-19 of journal volume Segment #1 and from blocks 0-14 of journal volume Segment #3. Similarly, 20 blocks of old data are read from blocks 87-106 of Data Volume #1. The old data is written to the UNDO stream in the last 5 blocks of journal volume Segment #5 and the first 15 blocks of journal volume Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Figure 2D:
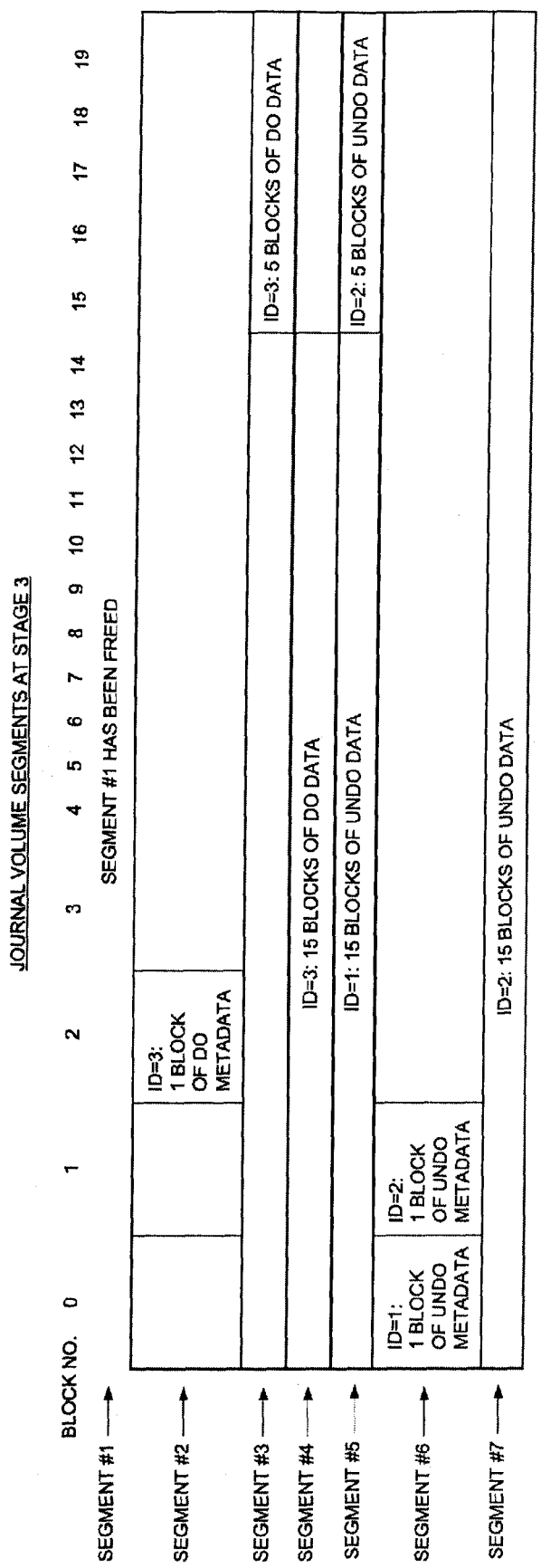

Finally, the new data from blocks 15-19 of journal volume Segment #1 and blocks 0-14 of journal volume Segment #3 is written into blocks 87-106 of Data Volume #1. The beginning pointer for the DO stream is moved forward to block 15 of journal volume Segment #3, and the beginning pointer for the DO METADATA stream is moved forward to block 2 of journal volume Segment #2. Segment #1 is freed from the DO stream, for recycling within the segment pool, and the list of segments for the DO stream is changed to Segment #3 and Segment #4. The journal history and the four streams at the end of stage #3 are illustrated in FIG. 2D.

At stage #4 a rollback to time 10:00:00.00 is performed. i.e., the write transaction with ID=2 is to be undone. The last entry is read from the UNDO METADATA stream, the location of the end of the UNDO METADATA stream being determined by its end pointer, i.e., the metadata before block 2 of journal volume Segment #6 is read, indicating two areas each of 20 blocks; namely, (a) the last 5 blocks of journal volume Segment #5 and the first 15 blocks of journal volume Segment #7, and (b) blocks 87-106 of Data Volume #1. Area (a) is part of the UNDO stream.

The 20 blocks of data from area (b) are read from Data Volume #1 and written to the beginning of the DO stream. As the beginning pointer of the DO stream is set to offset=15 of journal volume Segment #3, 15 blocks are written at the beginning of Segment #3, and the remaining 5 blocks are written to the end of Segment #8. The start pointer for the DO stream is set to block 15 of Segment #8. The list of segments for the DO stream is changed to Segment #8, Segment #3 and Segment #4. The metadata associated with the 20 blocks from area (b) is written to block 1 of Segment #2, and the end pointer of the DO METADATA stream is advanced to block 0 of Segment #2.

The 20 blocks of data in area (a) of the journal volume are then written to area (b) of the data volume. Finally, Segment #7 is freed for recycling in the segment pool, the UNDO stream ending pointer is moved back to Segment #5 of the journal volume, block 15, and the UNDO METADATA stream ending pointed is moved back to Segment #6 of the journal volume, block 1. The journal history and the four streams at the end of stage #4 are illustrated in FIG. 2E.

It will be appreciated that journal history 200 is used to rollback storage system 140 to the state that it was in at a previous point in time. Journal history is also used to selectively access data from storage 140 at such previous point in time, without necessarily performing a rollback. Selective access is useful for correcting one or more files that are currently corrupt, or for simply accessing old data.

Figure 3:
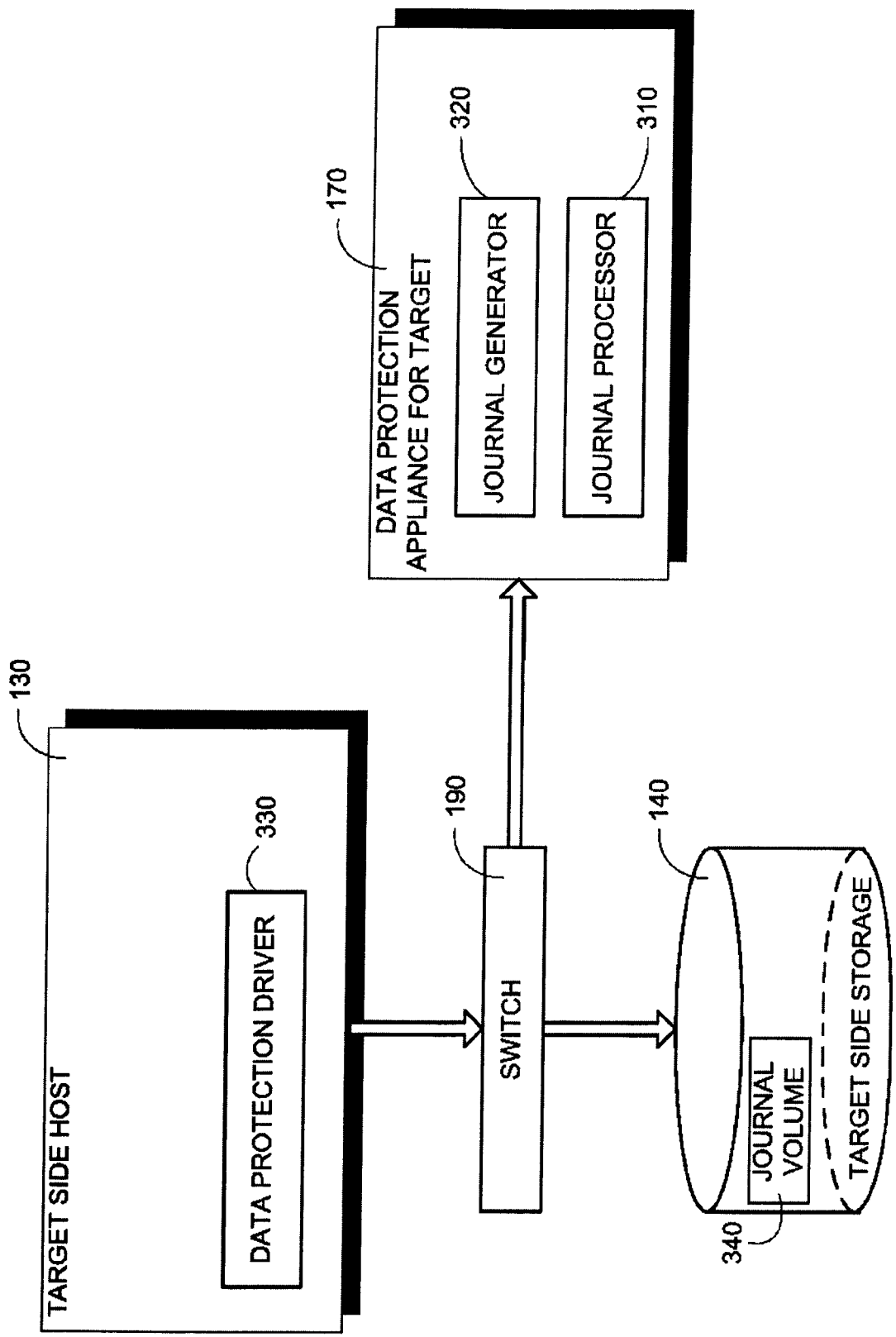
FIG. 3 is a block diagram of a point in time data recovery system, in accordance with an exemplary embodiment of the present invention.

FIG. 3 is a block diagram of a point in time data recovery system, in accordance with an exemplary embodiment of the present invention. The system includes a target side host 130, target side storage system 140 and target side DPA 170 (see FIG. 1). Target side DPA includes a journal processor 310 and a journal generator 320. Target side host 130 includes a DPA driver 330. Operation of these components is described in detail below. A journal volume 340 resides within storage system 140. DPA drivers are preferably installed on both source side host computer 110 and target side host computer 130. During normal operation, the DPA driver on source side host computer 110 acts as a "splitter", to intercept SCSI I/O commands in its data path, to replicate these commands, and to send a copy to the DPA. A DPA driver may reside on a host computer within a switch, such as switch 150.

Journal history 200 from FIG. 2 may be used to provide an adaptor for access to storage 140 at the state it was in at any specified point in time. Since journal history 200 contains the "undo" information necessary to rollback storage system 140, data that was stored in specific memory locations at the specified point in time may be obtained by undoing write transactions that occurred subsequent to such point in time. In general, however, using journal history 200 in this manner to rollback storage system 140 requires a significant number of I/O requests. At a production data rate of 50 MB/sec. with write transactions of average size 10 KB, each second of journal history 200 includes approximately 5,000 write transactions. To rollback one hour of time, for example, requires undoing 3,600*5,000=18,000,000 transactions.

The present invention provides efficient ways to use journal history 200 by an adaptor to access data that was stored in dynamically changing storage system 140 at a specified point in time. As described more fully with respect to FIGS. 4-7 below, journal processor 310 prepares a data structure that optimizes access to data in storage system 140 from a previous state. Journal processor 310 stores at least a portion of such data structure in memory of DPA 170, and host computer 130 indirectly accesses storage system 140 via the data structure in DPA 170. Thus, journal processor 310 serves as an adaptor for accessing storage system 140 at a specified point in time.

While the host computer is accessing and processing old data that was stored in storage system 140, new data is being generated through new write transactions. To manage the new write transactions, journal generator 310 preferably generates an auxiliary journal history, dedicated to tracking target side data processing that operates on old data.

Figure 4:
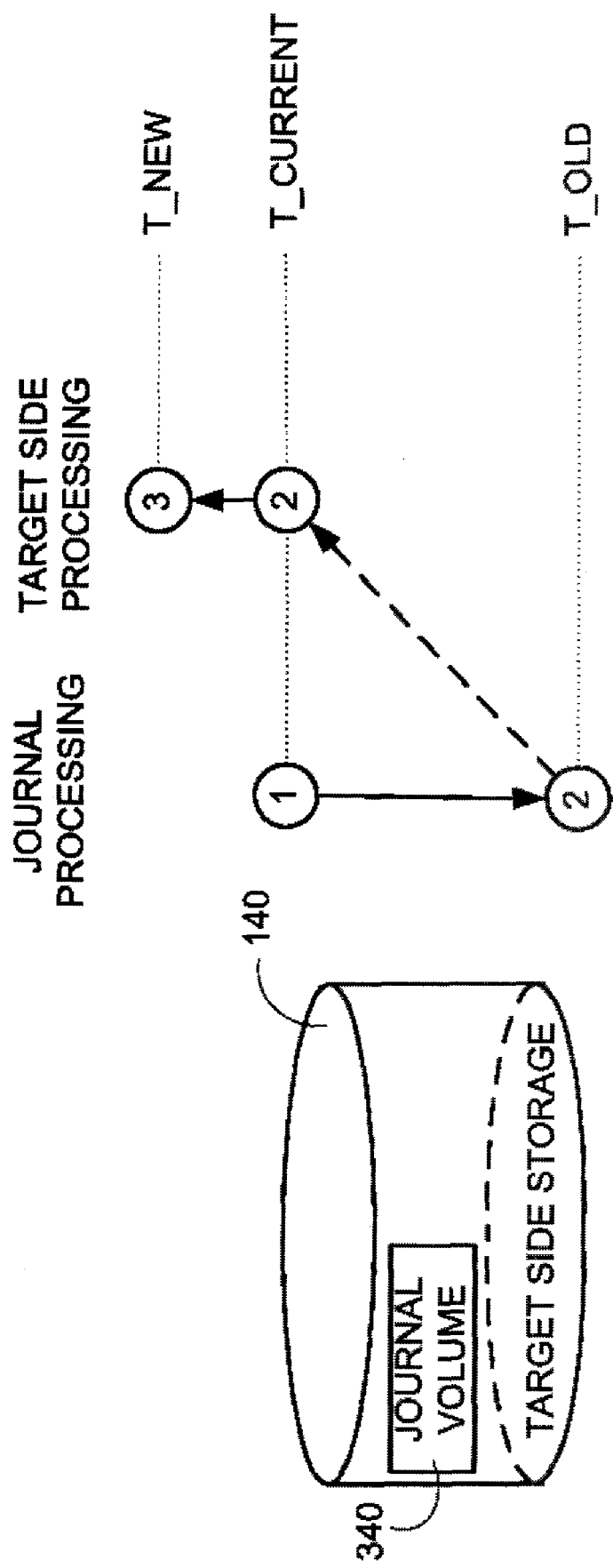
FIG. 4 is an illustration of a time-line for tracking new processing of old data, in accordance with an exemplary embodiment of the present invention.

FIG. 4 shows an illustrative time-line for tracking new processing of old data, in accordance with an exemplary embodiment of the present invention. The journal processor 310 brings the timeline back to a previous time, T_OLD, and journal generator 320 records new write transactions as target side processing brings the timeline forward from time T_CURRENT to T_NEW, thereby skipping the portion of journal history 200 between time T_OLD and T_CURRENT. Current data at time (1) is rolled back to old data at time (2). The rolled back data is used moved up in time to current data (2), thereby effectively skipping over the rolled back data between (1) and (2), which may be corrupt. From current data (2), target side processing advances to new data at time (3); i.e., the target side processing is applied to data (2) and not to data (1). In one implementation, the data between (1) and (2) is not actually skipped over—instead, the DO stream from the auxiliary journal history, stored by journal generator 320, is used instead of the DO stream from the primary journal history 200.

Figure 5:
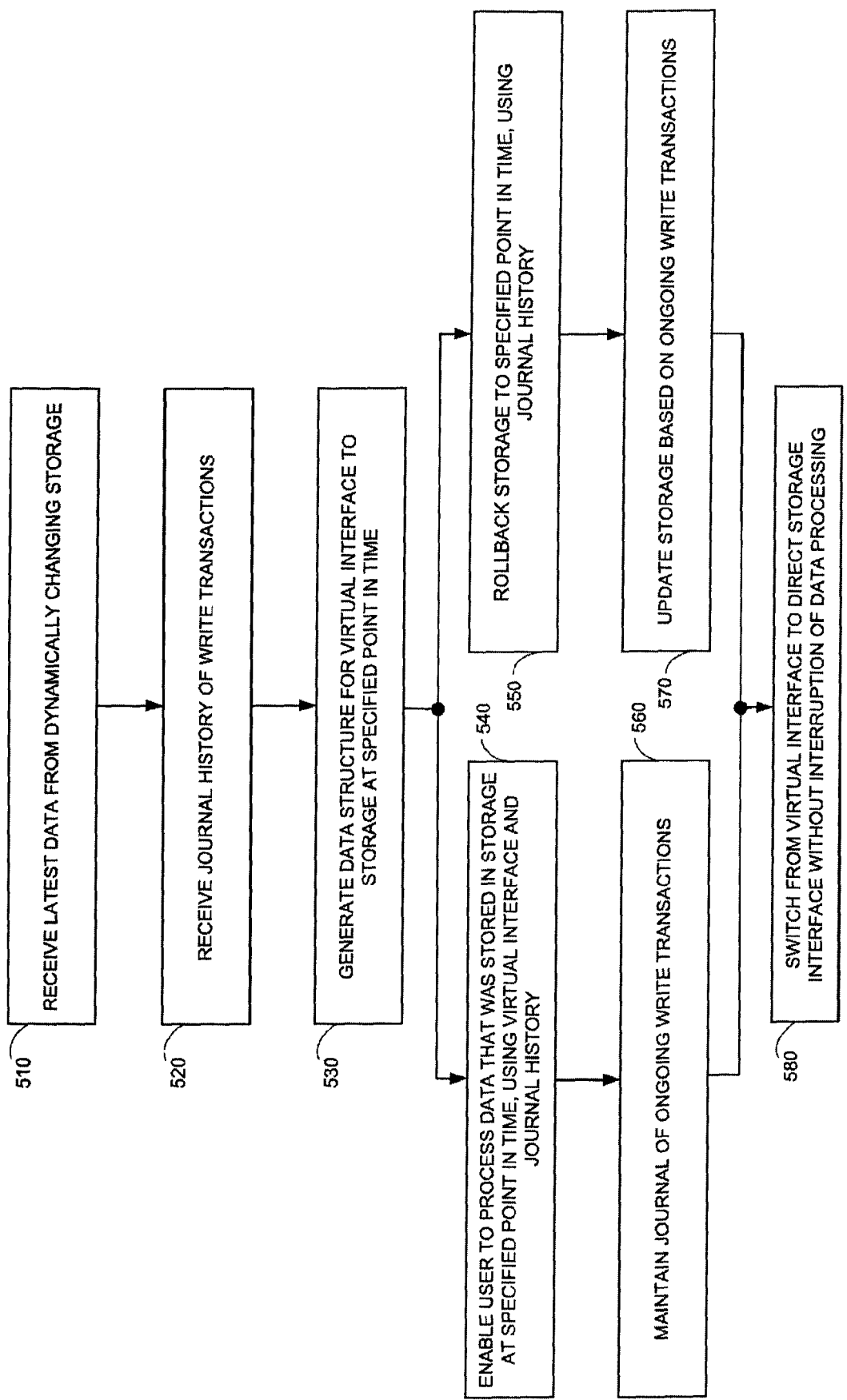
FIG. 5 is a flowchart of a method for point in time data recovery, in accordance with an exemplary embodiment of the present invention.

FIG. 5 is a flowchart of an exemplary method for point in time data recovery, in accordance with an illustrative embodiment of the present invention. At step 510 the method receives access to latest data from a dynamically changing storage, such as storage system 140 of FIG. 1, and at step 520 the method receives access to a journal history 200, such as journal history 200 of FIG. 2.

At step 530 the method generates a data structure for a virtual interface to the storage at the state it was in at a specified earlier point in time. In one embodiment of the present invention, the data structure generated at step 530 is a binary tree, and the data stored in the nodes of the binary tree includes sequential intervals of memory addresses.

Figure 6:
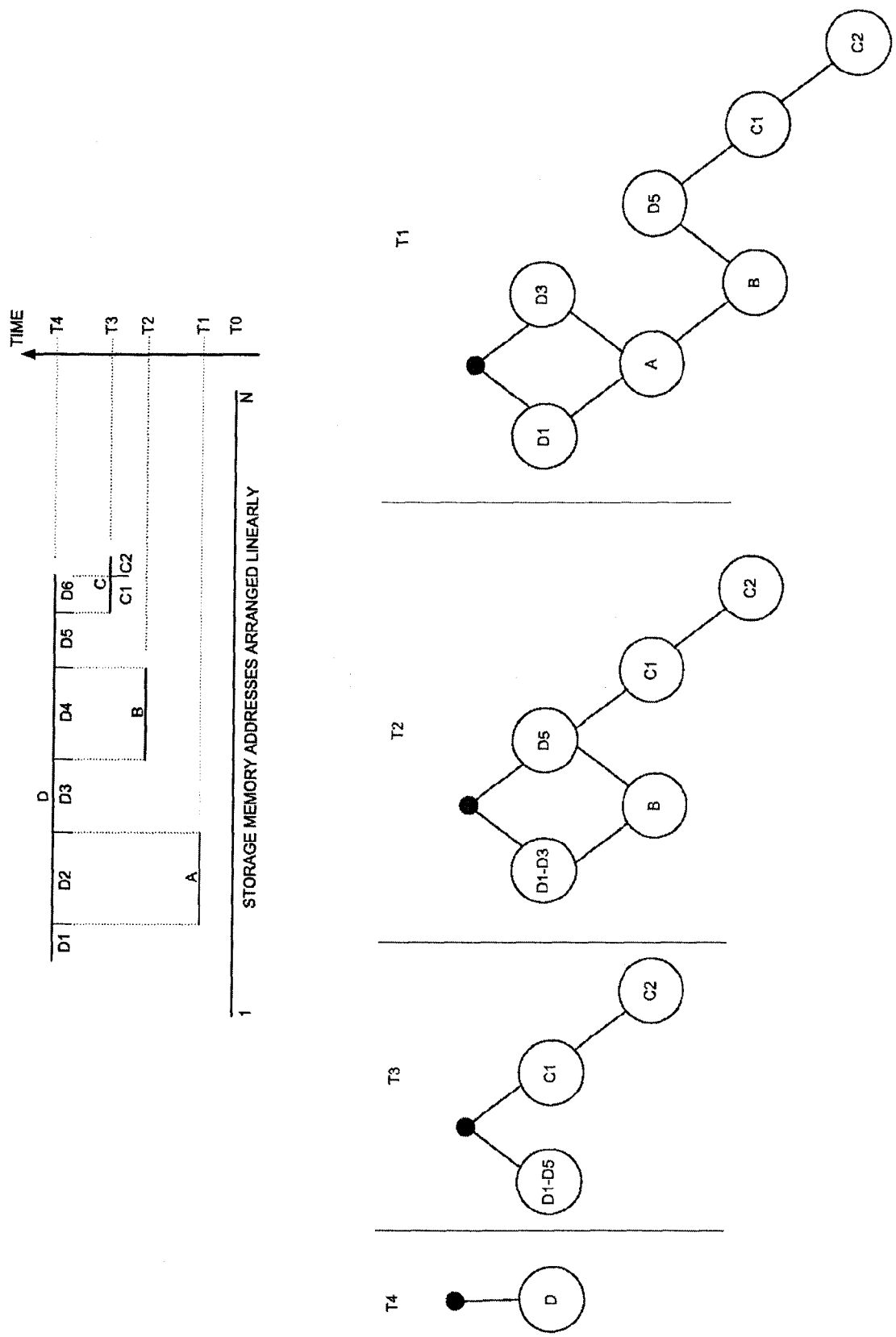
FIG. 6 is an illustration of a binary tree data structure for providing a virtual interface to data that was stored in a storage system at a previous time, in accordance with an exemplary embodiment of the present invention.

Specifically, reference is now made to FIG. 6, which is a simplified illustration of a binary tree data structure for providing a virtual interface to data that was stored in storage system 140 at a previous time, in accordance with one embodiment of the present invention. Shown is a simplified representation of memory addresses in storage system 140 arranged linearly in a sequence from 1 to N. Each write transaction in the journal history includes a plurality of designated memory addresses in which to replace old data with new data. Shown are four such pluralities, corresponding to write transactions of the forms indicated in TABLE II below.

TABLE II

Sample Write Transactions

ID = 1; Time T1; Write DATA_A into an interval, A, of memory locations.
ID = 2; Time T2; Write DATA_B into an interval, B, of memory locations.
ID = 3; Time T3; Write DATA_C into an interval, C, of memory locations.
ID = 4; Time T4: Write DATA_D into an interval, D, of memory locations.

The first transaction, with ID=1, writes DATA_A into interval A of memory locations shown in FIG. 6 at time T1, thereby overwriting data that was previously stored in interval A of storage system 140 at time T0. Similarly, the second transaction, with ID=2, writes DATA_B into interval B, at a later time T2, thereby overwriting data that was previously stored in interval B of storage system 140 at time T0; and the third transaction, with ID=3, writes DATA_C into interval C, at a later time T3, thereby overwriting data that was previously stored in interval C of storage system 140 at time T0. The fourth transaction, with ID=4, writes DATA_D into interval D, at a later time T4. It is noted that interval D overlaps with intervals A, B and C. Specifically, interval D is shown in FIG. 6 as being partitioned into non-overlapping subintervals D1-D6. The data written into subintervals D1, D3 and D5 overwrites the data that was previously stored in these subintervals of storage 140 at time T0. However, the data written into subinterval D2, which is the same as interval A, overwrites DATA_A, which was written into subinterval A at time T1. Similarly, the data written into subinterval D4, which is the same as interval B, overwrites DATA_B, which was written into subinterval B at time T2. The data written into subinterval D6, which is a subset of interval C, overwrites a portion of DATA_C; namely, the portion written into subinterval C1.

In an exemplary embodiment of the present invention, the journal entries in TABLE II are processed in reverse chronological order; i.e., from ID=4 to ID=1. Such order corresponds to a last-in-first-out order, since the journal entries were written in order from ID=1 to ID=4. As shown in FIG. 6, when each successive journal entry from ID=4 to ID=1 is processed, one or more nodes are added to successive binary trees. The binary tree at time T4 consists of a single root node, and a single node underneath the root that records the interval D, and the location in journal history 200 of DATA_D. The next binary tree, at time T3, includes additional nodes for C1 and C2; and the node recording interval D has been changed to record the interval D1-D5. Again, in addition to recording the intervals, the nodes of the binary tree also record the location in journal history 200 of the data corresponding to the intervals.

At time T2 the binary tree the interval D1-D5 is broken down into intervals D1-D3, D4 and D5, and two additional nodes are appended to the binary tree. Finally, at time T2, the interval D1-D3 is broken down into intervals D1, D2 and D3, and two additional nodes are appended to the binary tree, thereby generating the rightmost binary tree shown at the bottom of FIG. 6.

The binary tree structure thus generated provides, at a time such as T>T4, indirect access to the data that was in storage system 140 at an earlier time T<T1. For a given memory address, the binary tree is traversed to find an interval containing the given address. If such interval is located in a node of the binary tree, then the node also provides the location in journal history where the data can be extracted. Otherwise, if such interval is not located, then the data can be extracted from the latest state of the storage at time T4.

A disadvantage of the binary tree data structure is that storage of the binary tree requires a significant amount of memory with the DPA 170, and may exceed the DPA memory capacity. In a second embodiment of the present invention, which generally requires less DPA memory, the data structure generated at step 530 includes one or more sorted lists, each list storing data from write transactions in journal history 200, as described in detail hereinbelow.

Figure 7:
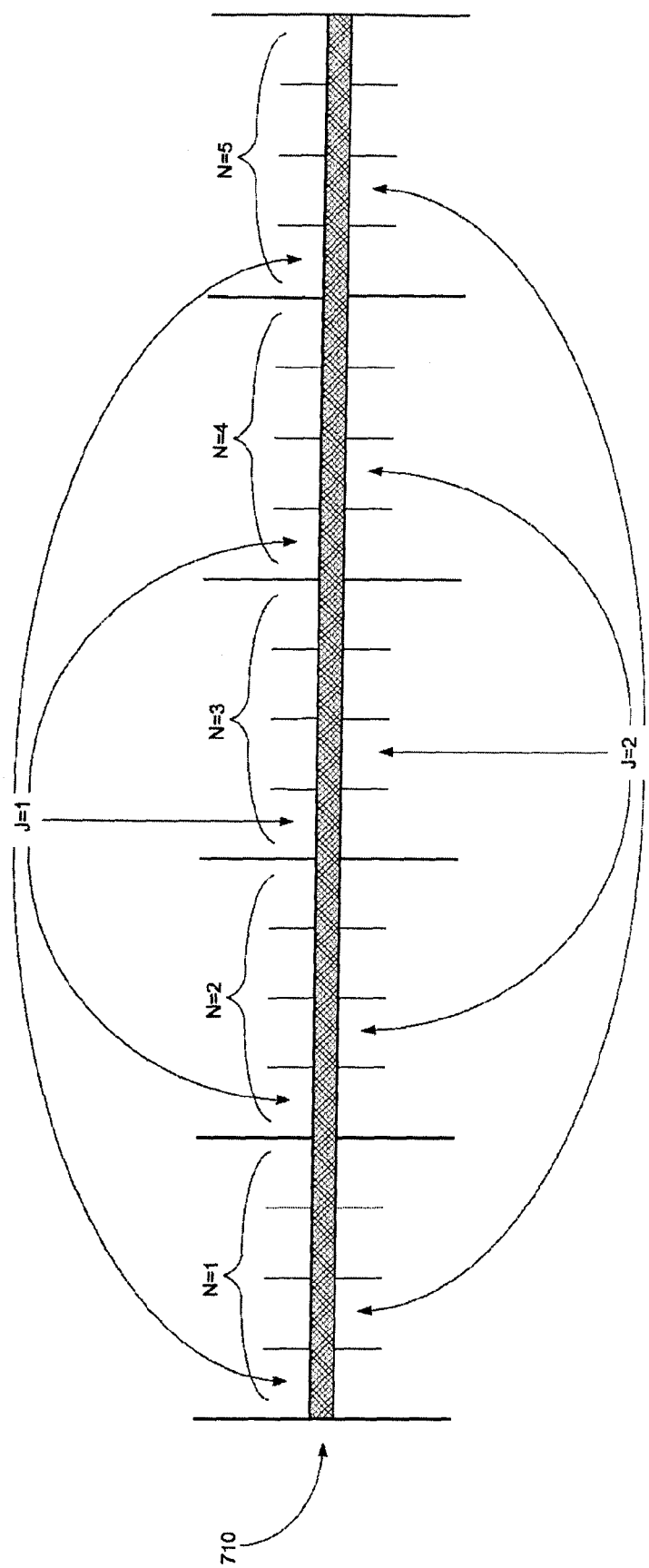
FIG. 7 is an illustration of a sorted list data structure for providing a virtual interface to data that was stored in a storage at a previous time, in accordance with an exemplary embodiment of the present invention.

Reference is now made to FIG. 7, which is a simplified illustration of a sorted list data structure for providing a virtual interface to data that was stored in a storage at a previous time, in accordance with a one embodiment of the present invention. Shown is a representation of memory addresses in storage system 140 as a linear sequence 710. The memory addresses are partitioned into interval bins designated by N=1, N=2, etc. The illustrated setup has five such bins. For example, if linear sequence 710 includes 1 TB of memory, then each bin spans 200 GB. In turn, each bin is further partitioned into sub-bins. The setup has four sub-bins per bin, each sub-bin spanning 50 GB. For example, the number of bins may be on the order of 100, and the number of sub-bins may be on the order of 100 sub-bins per bin. However, for the sake of clarity, the illustrative setup is shown with fewer bins and sub-bins.

In accordance with one embodiment of the present invention, an instant recovery request with a specified point in time triggers generation of ordered lists, as follows. The UNDO METADATA stream is parsed and binned appropriately according to data volume location. For each bin, a binary tree structure of non-overlapping intervals located within the bin, and ordered by beginning storage address, is generated as described above with respect to FIG. 6; and the binary tree entries are stored within the bin.

The various corresponding sub-bins of each bin are grouped together into ordered lists, designated by J=1, J=2, etc. The ordered list for J=1 includes the pluralities of memory addresses associated with write transactions subsequent to time T1, that store new data into memory addresses located within the sub-bins associated with J=1. The entries in the list, namely, the various pluralities of memory addresses, are sorted in linear order based on the lowest addresses therein. For example, using the sizes as above, the 10K blocks of memory starting at addresses 24G, 213G, 448G, 601G and 836G would each be stored in the J=1 list; and the 10K blocks of memory starting at addresses 174G, 361G and 589G would each be stored in the J=4 list.

The data within the bins may require a significant amount of memory storage. To this end, the ordered lists themselves are stored within storage system 140; and a filtered sub-list is stored in memory of DPA 170, the filtered sub-list including only every $M^{th}$ entry from the full list. For example, if M=1000, then each $100^{th}$ entry in a full list is stored in the sub-list. Alternatively, the filtered sub-list may include only one entry from each GB of storage locations.

The sorted lists and sub-lists thus generated provide a virtual interface to the data that was stored in storage system 140 at time T<T1. Given a specific memory address, the appropriate sub-bin is readily identified. The entries of the corresponding sub-list are searched to identify two bounding addresses, one below and one above the specific memory address. The two entries in the sub-list preferably include pointers to positions in the full lists that they correspond to and, using these pointers, a search is made of the full list between the two pointers. For example, suppose the specified memory address is 24G+178M+223K+66. Then the relevant sub-list is J=1. Suppose further that the entries 24G+13M and 32G+879M are located in the sub-list for J=1 at locations corresponding to locations 122,001 and 123,000 in the full list for J=1. Then the full sorted list can be searched over the 1,000 entries between 122,001 and 123,000 to locate an entry that contains the specified memory address 24G+178M+223K+66. If such an entry is located, then the UNDO data from the corresponding write transaction is the sought after data. Otherwise, if such an entry is not located, then the data currently in storage system 140 is the sought after data.

It may be appreciated that the advantage of combining sub-bins in a cyclical arrangement, as illustrated in FIG. 7, is that often write transactions are concentrated about small portions of memory. During data processing it is common for I/O requests to be clustered around a relatively small portion of storage, referred to as a "hot spot." Using cyclically arranged sub-bins often results in such write transactions being confined within relatively small intervals within the lists, thus making it easier to search through them. In distinction, using consecutive sub-bins would result in such transactions being confined within large intervals, making it more difficult to search through them.

The first and second embodiments, illustrated in FIGS. 6 and 7 respectively, and described above, are preferably triggered by a user request for access to data from an earlier point in time. In a third embodiment, a data structure is generated in background during normal course of production operation. Whenever data is written to a data volume and UNDO data is recorded in a journal history, the UNDO data is also buffered in memory. When the buffer is full, the buffer entries are sorted by storage address into a sorted list, and the sorted list is written to the journal volume. Preferably, the sorted list is arranged according to a binary tree structure. Alternatively, the sorted list may be arranged in sequential order. The sorted lists, themselves, are chronologically ordered according to the times that data was written to the data volume. Subsequently, when a user requests recovery to a previous point in time, the sorted lists are merged.

It will be appreciated that the data structures shown in FIGS. 6 and 7 may be used to access data that was stored in storage system 140 at an earlier point in time T<T1. In certain circumstances it may be desired to rollback storage system 140 to time T<T1; in other circumstances it may only be desired to access data from T<T1, without a storage rollback.

In an exemplary embodiment of the present invention, the data structures shown in FIGS. 6 and 7 are used for source side data recovery; i.e., for recovering data that was in target storage system 140 at time T<T1, in situations where the data in source side storage system 120 became corrupt afterwards. Source side storage system 120 may have become corrupt due to a disaster at the physical site housing storage system 120, or due to a computer virus, or due to human error. Whatever the cause of the disaster, the data recovery system of the present invention may be used to restore storage system 120 to the state it was in at time T<T1, prior to the disaster.

Referring back to FIG. 5, at step 540 a user processes data from a previous point in time, using the virtual interface and the journal history, as described above with reference to FIGS. 6 and 7. Simultaneously while the user is processing data from the previous point in time using the virtual interface, at step 550 a full rollback of the storage system is performed in parallel. At step 560 an auxiliary journal history of write transactions is recorded, reflecting the I/O requests originating from the user's data processing at step 540. At step 570, in parallel with step 560, the storage system is updated by applying write transactions recorded in the auxiliary journal history. Finally, at step 580 a seamless switch is made from the virtual interface to a direct interface for accessing the storage system. Accomplishing such a seamless switch involves connections between logical units and physical storage, and is described in detail with respect to FIG. 8 below.

In general, physical storage systems may store data in a variety of physical devices, such as disks, arrays of disks and disks on key. Physical storage systems include computers that act as controllers, which manage storage of data. Logical units are virtual storage devices, exposed by the controllers. The physical storage systems have the capability of responding to commands issued to logical units.

Generally, a host operating system creates devices for every logical unit it identifies. Such a device is characterized by (i) its logical units, and (ii) its data source; and this characterization is referred to as the device's "personality." Data may arrive at a first logical unit, A, via a second logical unit, B. In accordance with one embodiment of the present invention, data recovery is achieved by changing a data source.

Figure 8:
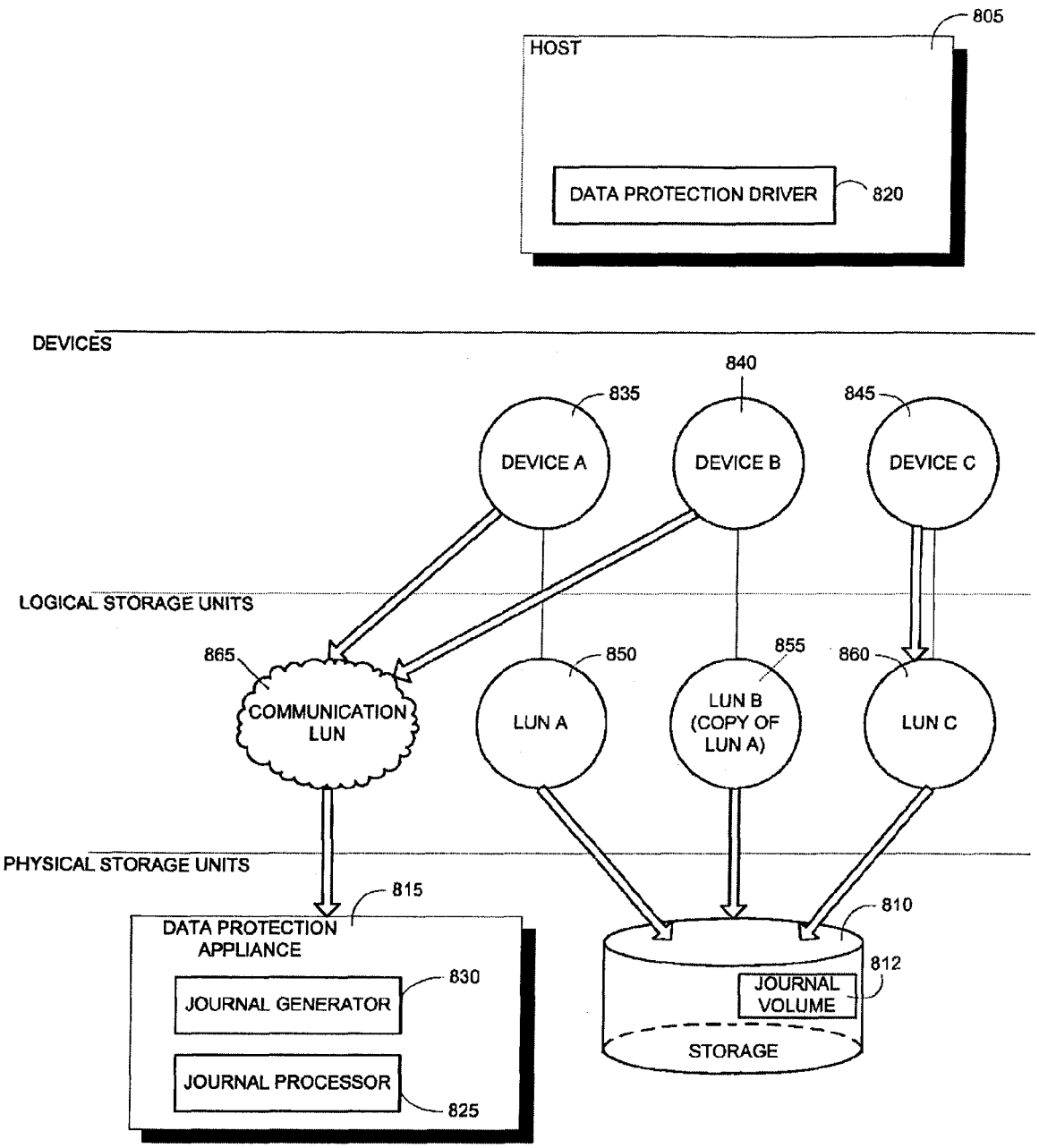
FIG. 8 is an illustration of a structure used for providing a virtual interface to data that was stored in a dynamically changing storage at a specified point in time, in accordance with an exemplary embodiment of the present invention.

Reference is now made to FIG. 8, which is a simplified illustration of a structure used for providing a virtual interface to data that was stored in a dynamically changing storage at a specified point in time, in accordance with an embodiment of the present invention. The structure includes a host computer 805, a storage system 810 including a journal volume 812, and a DPA 815. Host computer 805 includes a data protection driver 820. DPA 815 includes a journal processor 825 and a journal generator 830, as described above with reference to FIG. 3, for example. Host computer 805 has access to three devices 835, 840 and 845, designated respectively as Device A, Device B and Device C. Each device is associated with a logical unit number (LUN), 850, 855 and 860, designated as LUN A, LUN B and LUN C, respectively. In turn, each LUN is associated with one or more memory volumes in storage system 810.

The association of a LUN with one or more memory volumes in storage system 810 is flexible. For example, as shown in FIG. 8, LUN B may access the same memory volumes as does LUN A, thus serving as a copy of LUN A. In accordance with the illustrative embodiment of the present invention, a communication LUN 865 is configured so as to access storage 810 indirectly, via DPA 815. To a user of host computer 805 this may be transparent; i.e., the user is unaware of whether the LUN for a device is accessing storage system 810 directly, or indirectly.

During a recovery rollback, write transactions in journal history 200 are undone, so as to restore storage system 810 to the state it was at, at time T1. Generally it takes a significant amount of time to perform a full rollback of storage system 810. In the meantime, while the rollback is occurring, indirect access to the rolled back data is enabled via the data structures illustrated in FIGS. 6 and 7. Thus, a user of host computer 805 is able to access and process the rolled back data, via communication LUN 865, before the full rollback operation is complete.

As the user processes the rolled back data via communication LUN 865, an auxiliary journal history is maintained, for recording write transactions applied to the rolled back data, as illustrated in FIG. 4. Had the user been accessing storage system 810 directly, via a direct LUN, the write transactions would be entered to the rolled back journal history. However, while the full rollback operation is occurring, the journal history cannot be rolled back. Instead, an auxiliary journal history is maintained.

After the rollback operation is complete, and storage 805 has been rolled back to its earlier state at time T1, the journal history can also be rolled back by deleting the write transactions that were undone during the rollback operation. The auxiliary journal history can then be appended to the rolled back journal, thereby combining the two histories into a single journal going forward. At that point, communication LUN 865 can be switched to a LUN with direct access to storage system 810, resulting in a seamless transition from indirect to direct access, without interruption of the user's data processing.

It will be appreciated that the architecture of FIG. 8 enables rollback to a multiplicity of previous points in time. For rollback to single point in time, it suffices to use a single LUN. For rollback to multiple points in time, additional LUNs are created, so as to generate additional devices in the host. Creation of additional LUNs may be performed by a user, or by a DPA. In one embodiment of the present invention, the DPA creates small additional LUNs, which serve to provide device "personalities" as described above; and the DPA uses a physical LUN for storage rollback. The illustrative embodiment provides user access to multiple points in time, while simultaneously rolling back storage system 810.

Thus it will be appreciated that multiple devices may be configured to access storage system 810 indirectly through communication LUN 865, each device being used to access data having a different age. Device A can be used to access data that was stored in storage system 810 at a first earlier time T1, and Device B can be used to access data from a second earlier time, T2.

Having read the above disclosure, it will be appreciated by those skilled in the art that the present invention can be used to provide access to historical data within a wide variety of systems. Although the invention has been described with reference to a data recovery system that includes source side and target side storage systems, the present invention applies to general data management systems that may required "go back" access to data that was processed at an earlier point in time.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method to access data from a previous point in time, comprising:
   providing a journal history of write transactions comprising:
   a DO stream comprising data for writing in a storage system;
   an UNDO stream comprising data that is overwritten in the storage system;
   a DO metadata stream comprising a first pointer to an offset in the DO stream where the data for writing in a storage system is located;
   an UNDO metadata stream comprising a second pointer to an offset in the UNDO stream where the data that is overwritten is located;
   writing new data to the storage system if the data that is to be overwritten is transferred to the UNDO stream;
   receiving data stored in the storage system of addressable memory, the storage system including a plurality of addresses;
   receiving the journal history of write transactions for the storage system, each write transaction comprising a plurality of designated memory addresses, a corresponding plurality of current data to write in the designated memory addresses for storage, and a time indicator;

rolling back to data that was stored at a specified point in time by copying data from the UNDO stream to the storage system to form a rolled back storage;

generating a data structure that represents a virtual interface to the rolled back storage at the specified point in time based on the write transactions in the journal history having a time subsequent to the specified point in time; and enabling a user to process data from the specified point in time, via the virtual interface and the journal history.

2. The method of claim 1 wherein rolling back the storage to the data that was stored therein at the specified point in time, comprises rolling back the storage to the data that was stored therein at the specified point in time while the user is using the virtual interface to the rolled back data.

3. The method of claim 1 further comprising switching from the virtual storage interface via the journal history, over to a direct interface to the rolled back storage, after completion of said rolling back, thereby enabling the user to continue data processing without interruption.

4. The method of claim 3 further comprising:
generating a journal of auxiliary write transactions while the user is processing data via the virtual interface; and
applying at least a portion of the auxiliary write transactions after said rolling back and prior to said switching.

5. The method of claim 1 wherein the data structure that represents the virtual interface includes a binary tree data structure.

6. The method of claim 5 further comprising:
generating a multiplicity of non-overlapping intervals of contiguous memory addresses, based on the pluralities of designated memory addresses in the write transactions in the journal history that have a date and time subsequent to the specified point in time; and
organizing the multiplicity of non-overlapping intervals into the binary tree data structure.

7. The method of claim 6 further comprising, for each write transaction in the journal history having a time subsequent to the specified point in time, examining the write transaction, comprising:
extracting the plurality of designated memory addresses within the write transaction currently being examined;
comparing the extracted plurality of designated memory addresses with previously extracted pluralities of memory addresses, to identify overlap therewith;
decomposing the plurality of designated memory addresses currently being examined into at least one overlapping part and at least one non-overlapping part;
appending the at least one non-overlapping part to a list of pluralities of memory addresses; and
associating the at least one non-overlapping part with the write transaction currently being examined.

8. The method of claim 6 wherein said enabling comprises identifying data that was stored in the storage at a requested memory address at the specified point in time, comprising:
searching for an interval of contiguous memory addresses in the binary tree data structure that contains the requested memory address; and
finding the last data written to the interval identified by said searching, within the journal history.

9. The method of claim 1 wherein the data structure that represents the virtual interface includes at least one sorted list.

10. The method of claim 9 further comprising:
defining a partition of the storage memory into a multiplicity of bins, each bin corresponding to a contiguous range of memory addresses;
for each bin of the partition, initializing a sorted list of pluralities of memory addresses for such bin; and
for each write transaction in the journal history having a data and time subsequent to the specified point in time, examining the write transaction, comprising:
extracting the plurality of designated memory addresses within the write transaction currently being examined;
allocating the plurality of designated memory addresses into an appropriate one of the multiplicity of bins; and
recording the plurality of designated memory addresses within the sorted list of the appropriate bin.

11. The method of claim 10 further comprising, for each bin of the partition, recording selected ones of the pluralities of memory addresses into a filtered list for such bin.

12. The method of claim 11 wherein said enabling comprises identifying data that was stored in the storage at a requested memory address at the specified point in time, comprising:
identifying a relevant bin to which the requested memory address corresponds;
locating two pluralities of memory addresses, within the filtered list for the relevant bin, which bound the requested memory address; and
searching a portion of the sorted list for the relevant bin, for pluralities of memory addresses that include the requested memory address, wherein the portion is limited to those pluralities of memory addresses situated between the bounding pluralities provided by said locating.

13. A data access system, comprising:
a storage system of addressable memory, the storage system including data stored at a plurality of addresses;
a journal history of write transactions for said storage system, each write transaction comprising a plurality of designated memory addresses, a corresponding plurality of current data to write in the designated memory addresses for storage, and a time indicator, the journal history of write transactions comprising:
a DO stream comprising data for writing in a storage system;
an UNDO stream comprising data that is overwritten in the storage system, wherein new data is written to the storage system if data that is to be overwritten is transferred to the UNDO stream;
a DO metadata stream comprising a first pointer to an offset in the DO stream where the data for writing in a storage system is located;
an UNDO metadata stream comprising a second pointer to an offset in the UNDO stream where the data that is overwritten is located;
a data protector, comprising:
a data protector memory;
a journal processor for generating a data structure, stored within said data protector memory, which represents a virtual interface to the storage at a specified point in time, based on the write transactions in the journal having a data and time subsequent to the specified point in time;
a host application driver for enabling a user to process data from the specified point in time, via the virtual interface and the journal history, via the virtual interface and the journal history.

14. The data access system of claim 13 wherein said storage protector further comprises a storage manager for rolling back the storage to the data that was stored therein at the specified point in time, based on the journal of write transactions, while the user is using the virtual interface to the storage.

15. The data access system of claim 14 wherein said data protector further comprises a data protector switcher for switching from the virtual storage interface via the journal history, over to a direct interface to the rolled back storage, after completion of said rolling back, thereby enabling the user to continue data processing without interruption.

16. A non-transitory computer-readable storage medium storing program code for causing a computing device:
   to receive data stored in a storage system of addressable memory, the storage system including a plurality of addresses;
   to receive a journal history of write transactions for the storage system, each write transaction comprising a plurality of designated memory addresses, a corresponding plurality of current data to write in the designated memory addresses for the storage system, and a time indicator, the journal history of write transactions comprising:
      a DO stream comprising data for writing in the storage system;
      an UNDO stream comprising data that is overwritten in the storage system; to write new data to the storage system if data that is to be overwritten is transferred to the UNDO stream;
      a DO metadata stream comprising a first pointer to an offset in the DO stream where the data for writing in the storage system is located;
      an UNDO metadata stream comprising a second pointer to an offset in the UNDO stream where the data that is overwritten is located;
   to roll back to data that was stored at a specified point in time by copying data from the UNDO stream to the storage system to form a rolled back storage;
   to generate a data structure that represents a virtual interface to the rolled back storage at the specified point in time based on the write transactions in the journal history having a time subsequent to the specified point in time; and
   to enable a user to process the data from the specified point in time, via the virtual interface and the journal history.

17. The medium according to claim 16 wherein the program code to roll back the storage to the data that was stored therein at the specified point in time while the user is using the virtual interface to the storage.

18. The medium according to claim 16 further comprising program code switching from the virtual storage interface via the journal history, over to a direct interface to the rolled back storage, after completion of said rolling back, thereby enabling the user to continue data processing without interruption.

19. The medium of claim 18 further comprising program code for:
   generating a journal of auxiliary write transactions while the user is processing data via the virtual interface; and
   applying at least a portion of the auxiliary write transactions after said rolling back and prior to said switching.

20. The medium of claim 19 further comprising program code for:
   generating a multiplicity of non-overlapping intervals of contiguous memory addresses, based on the pluralities of designated memory addresses in the write transactions in the journal history that have a date and time subsequent to the specified point in time; and
   organizing the multiplicity of non-overlapping intervals into the binary tree data structure.

* * * * *